United States Patent
Kitada

(10) Patent No.: US 10,928,956 B2
(45) Date of Patent: Feb. 23, 2021

(54) PRESSURE SENSOR FOR USE IN FOLDING STRUCTURE, AND ELECTRONIC DEVICE

(71) Applicant: Murata Manufacturing Co., Ltd., Nagaokakyo (JP)

(72) Inventor: Hiroaki Kitada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/594,672

(22) Filed: Oct. 7, 2019

(65) Prior Publication Data

US 2020/0033992 A1 Jan. 30, 2020

Related U.S. Application Data

(63) Continuation of application No. PCT/JP2018/035254, filed on Sep. 25, 2018.

(30) Foreign Application Priority Data

Oct. 2, 2017 (JP) .............................. JP2017-192611

(51) Int. Cl.
*G06F 3/041* (2006.01)
*G06F 3/044* (2006.01)

(52) U.S. Cl.
CPC .......... *G06F 3/0418* (2013.01); *G06F 3/0414* (2013.01); *G06F 3/0447* (2019.05); *G06F 2203/04102* (2013.01)

(58) Field of Classification Search
CPC .... G06F 3/0416; G06F 3/0417; G06F 3/0418; G06F 3/04142; G06F 3/04144;

(Continued)

(56) References Cited

U.S. PATENT DOCUMENTS 9,348,362 B2 5/2016 Ko et al.
9,582,103 B2 2/2017 Ando
(Continued)

FOREIGN PATENT DOCUMENTS

JP 2014003349 A 1/2014
JP 2014164602 A 9/2014
(Continued)

OTHER PUBLICATIONS

International Search Report Issued for PCT/JP2018/035254, dated Dec. 25, 2018.

(Continued)

*Primary Examiner* — Robert J Michaud
(74) *Attorney, Agent, or Firm* — Arent Fox LLP

(57) ABSTRACT

A pressure sensor for use in a folding structure that includes a foldable piezoelectric film, a first electrode disposed on a first main surface of the piezoelectric film, a plurality of second electrodes disposed side by side on a second main surface of the piezoelectric film so as to face the first electrode and to be positioned along a direction orthogonal to a folding line of the piezoelectric film, a folding detection unit that detects a folded state of the piezoelectric film, and a processing unit that changes processing of at least one of signals generated on the second electrode when the piezoelectric film receives a pressing operation and the folding detection unit is detecting the folded state of the piezoelectric film.

19 Claims, 10 Drawing Sheets

(58) Field of Classification Search
CPC ....... G06F 3/04146; G06F 2203/04102; G01L 9/06; G01L 9/08
See application file for complete search history.

(56) References Cited

U.S. PATENT DOCUMENTS

| | | | |
|---|---|---|---|
| 9,804,041 B2 | 10/2017 | Tajitsu et al. | |
| 2003/0057808 A1 | 3/2003 | Lee et al. | |
| 2014/0049137 A1* | 2/2014 | Ando | G01B 7/16 310/330 |
| 2014/0049463 A1* | 2/2014 | Seo | G06F 3/016 345/156 |
| 2015/0168237 A1 | 6/2015 | Tajitsu et al. | |
| 2015/0185955 A1 | 7/2015 | Ando | |
| 2018/0040803 A1* | 2/2018 | Park | G06F 1/1652 |

FOREIGN PATENT DOCUMENTS

| | | |
|---|---|---|
| JP | 2017142656 A | 8/2017 |
| WO | 2012137897 A1 | 10/2012 |
| WO | 2013175848 A1 | 11/2013 |
| WO | 2014042170 A1 | 3/2014 |

OTHER PUBLICATIONS

Written Opinion of the International Searching Authority issued for PCT/JP2018/035254, dated Dec. 25, 2018.

* cited by examiner

Prior Art

PRESSURE SENSOR FOR USE IN FOLDING STRUCTURE, AND ELECTRONIC DEVICE

CROSS REFERENCE TO RELATED APPLICATIONS

The present application is a continuation of PCT/JP2018/035254 filed Sep. 25, 2018, which claims priority to Japanese Patent Application No. 2017-192611, filed Oct. 2, 2017, the entire contents of each of which are incorporated herein by reference.

TECHNICAL FIELD

The present invention relates to a pressure sensor for use in a folding structure, and an electronic device using the pressure sensor.

BACKGROUND

Patent Document 1 (identified below) discloses a foldable smart phone. Further, Patent Document 2 (also identified below) discloses a touch panel sensor which simultaneously detects a pressed position and information regarding the magnitude of a pressing force by providing a position detection element and a pressure sensitive sensor in an overlapping manner.

Patent Document 1: U.S. Pat. No. 9,348,362.
Patent Document 2: WO 2012/137897 A.

A case where the touch panel sensor according to Patent Document 2 is used for the smart phone according to Patent Document 1 is considered. For example, FIGS. 10(A) and 10(B) are diagrams for describing a pressure sensor 90 for use in a folding structure in the prior art. As shown in FIG. 10(A), when pressure is applied from one side in an unfolded state, a piezoelectric sheet 91 of the pressure sensor 90 is distorted in a pressed direction. The piezoelectric sheet 91 is distorted only in one direction, and therefore generates a charge of predetermined polarity. In contrast, as shown in FIG. 10(B), when pressure is applied from one side in a folded state, both upper and lower overlapping layers of the piezoelectric sheet 91 of the pressure sensor 90 are distorted in the same direction. Since the piezoelectric sheet is in a folded state, charges of opposite polarities are generated. Therefore, since charges generated as a whole are canceled between the overlapping piezoelectric sheets, there is a possibility that the detection cannot be performed with high sensitivity.

SUMMARY OF THE INVENTION

In view of the above situation, an object of an exemplary embodiment of the present invention is to provide a pressure sensor for use in a folding structure that is configured to perform detection with high sensitivity even in a folded state. Also, an electronic device is provided using the pressure sensor.

Accordingly, in an exemplary embodiment, a pressure sensor for use in a folding structure is provided that includes a foldable piezoelectric film, a first electrode arranged on a first main surface of the piezoelectric film, a plurality of second electrodes arranged side by side on a second main surface of the piezoelectric film so as to face the first electrode and be along a direction orthogonal to a folding line of the piezoelectric film, a folding detection unit configured to detect a folded state in which the piezoelectric film is folded, and a processing unit configured to change processing of at least one of signals generated on the second electrode when the piezoelectric film receives a pressing operation when the folding detection unit detects the folded state of the piezoelectric film.

In this configuration, the folding detection unit is configured to detect the state in which the piezoelectric film is folded. In the state in which the piezoelectric film is folded, the orientations of the first main surfaces of stacked layers of the piezoelectric film are opposite to each other. At this time, at least one of the plurality of second electrodes overlaps in the stacking direction of the piezoelectric film. When the piezoelectric film receives a pressing operation when the piezoelectric film is folded as described above, the processing unit changes processing of at least one of signals generated on the second electrodes. In this manner, a signal generated on the second electrode can be changed between the state where the piezoelectric film is folded and a state where the piezoelectric film is not folded. Therefore, even when the piezoelectric film is folded, detection can be performed with high sensitivity.

Moreover, an electronic device is provided according to one exemplary embodiment that includes the pressure sensor for use in a folding structure.

As such, this configuration, which uses the pressure sensor for use in a folding structure, is adaptable to a foldable electronic device.

According to the exemplary embodiments, detection can be performed with high sensitivity even in the folded state of the piezoelectric film.

DETAILED DESCRIPTION

Hereinafter, an electronic device and a pressure sensor for use in a folding structure according to exemplary embodiments of the present invention will be described. It is noted that, hereinafter, for purposes of the description of the exemplary embodiments, the phrase "pressure sensor for use in a folding structure" is simply referred to as a "pressure sensor".

Figure 1A:
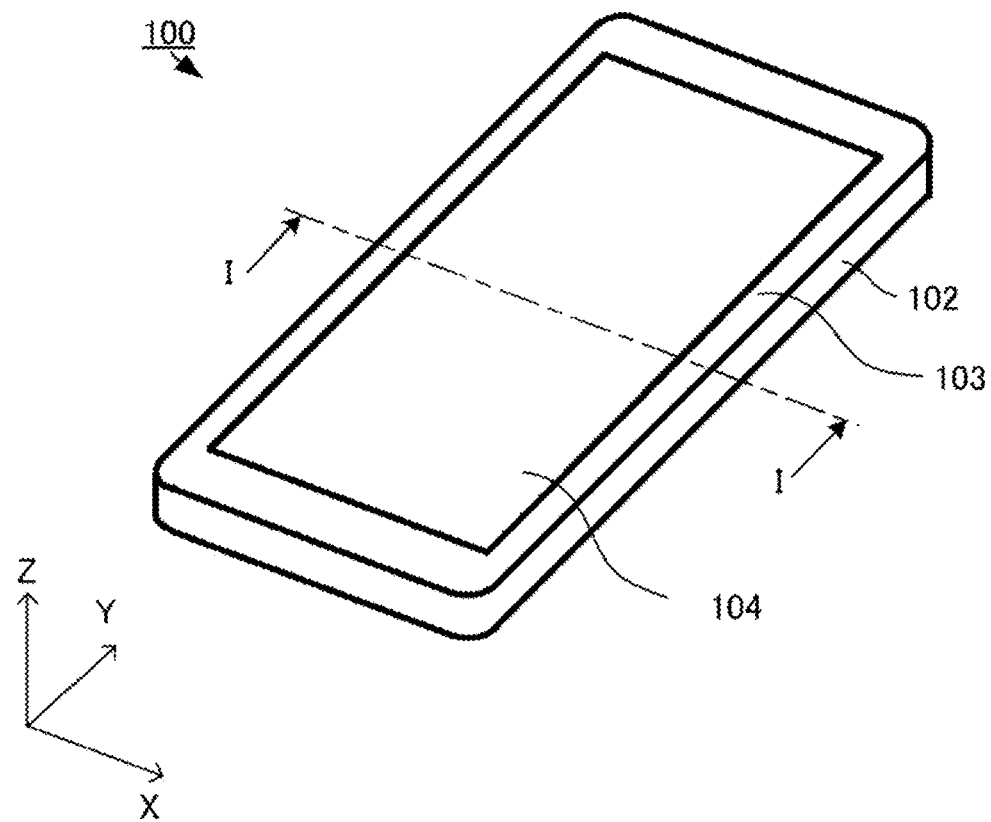
FIG. 1(A) is a perspective view of an electronic device including a pressure sensor for use in a folding structure according to a first embodiment.
Figure 1B:
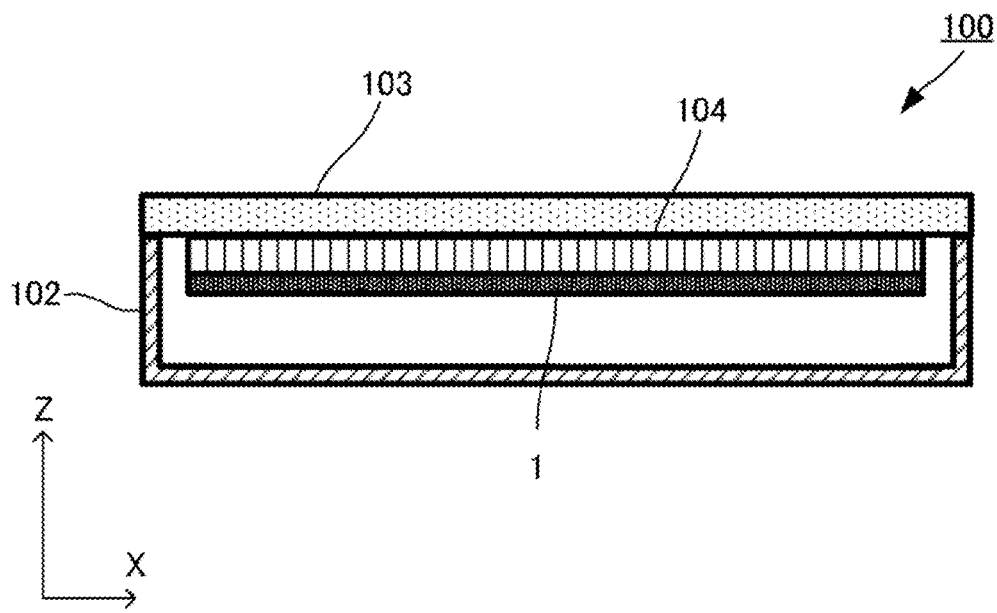
FIG. 1(B) is a cross-sectional view of the electronic device.

FIG. 1(A) is a perspective view of the electronic device including the pressure sensor according to a first embodiment of the present invention, and FIG. 1(B) is a schematic cross-sectional view taken along line I-I shown in FIG. 1(A). It is noted that the electronic device shown in FIGS. 1(A) and 1(B) is an exemplary embodiment, and the present invention is not limited to the above, and can be appropriately modified in accordance with the exemplary aspects described herein. Further, in each drawing, wiring and the like are omitted in order to clarify description.

As shown in FIG. 1(A), an electronic device 100 includes a housing 102 having a substantially rectangular parallelepiped shape with an opened upper surface. The electronic device 100 includes a flat front panel 103 disposed to seal a cavity on the upper surface of the housing 102. The front panel 103 is configured as an operation surface on which a user performs a touch operation using a finger, a pen, or the like. In the following description, it is assumed that a width direction (i.e., a lateral direction) of the housing 102 is an X direction, a length direction (i.e., longitudinal direction) is a Y direction, and a thickness direction (i.e., a vertical or height direction) is a Z direction.

As shown in FIG. 1(B), the electronic device 100 includes a display unit 104 and a pressure sensor 1 inside the housing 102. The pressure sensor 1 and the display unit 104 are stacked in this order from the inside toward the outside of the housing 102. The display unit 104 is formed on a surface of the front panel 103 inside the housing 102. It is noted that the pressure sensor 1 and the display unit 104 may be arranged in the opposite manner. In this case, the pressure sensor 1 is formed of a light transmitting material.

The electronic device 100 is entirely formed of a flexible material. In the first embodiment, the electronic device 100 can be folded with the X direction as a bending line. That is, the electronic device 100 can be opened and closed or wound.

When the user performs a touch operation on the front panel 103 using a finger or a pen, a pressing force is transmitted to the pressure sensor 1 through the front panel 103 and the display unit 104. As will be described in detail later, the pressure sensor 1 outputs a potential corresponding to the pressing force applied by the operation received by the front panel 103.

Figure 2:
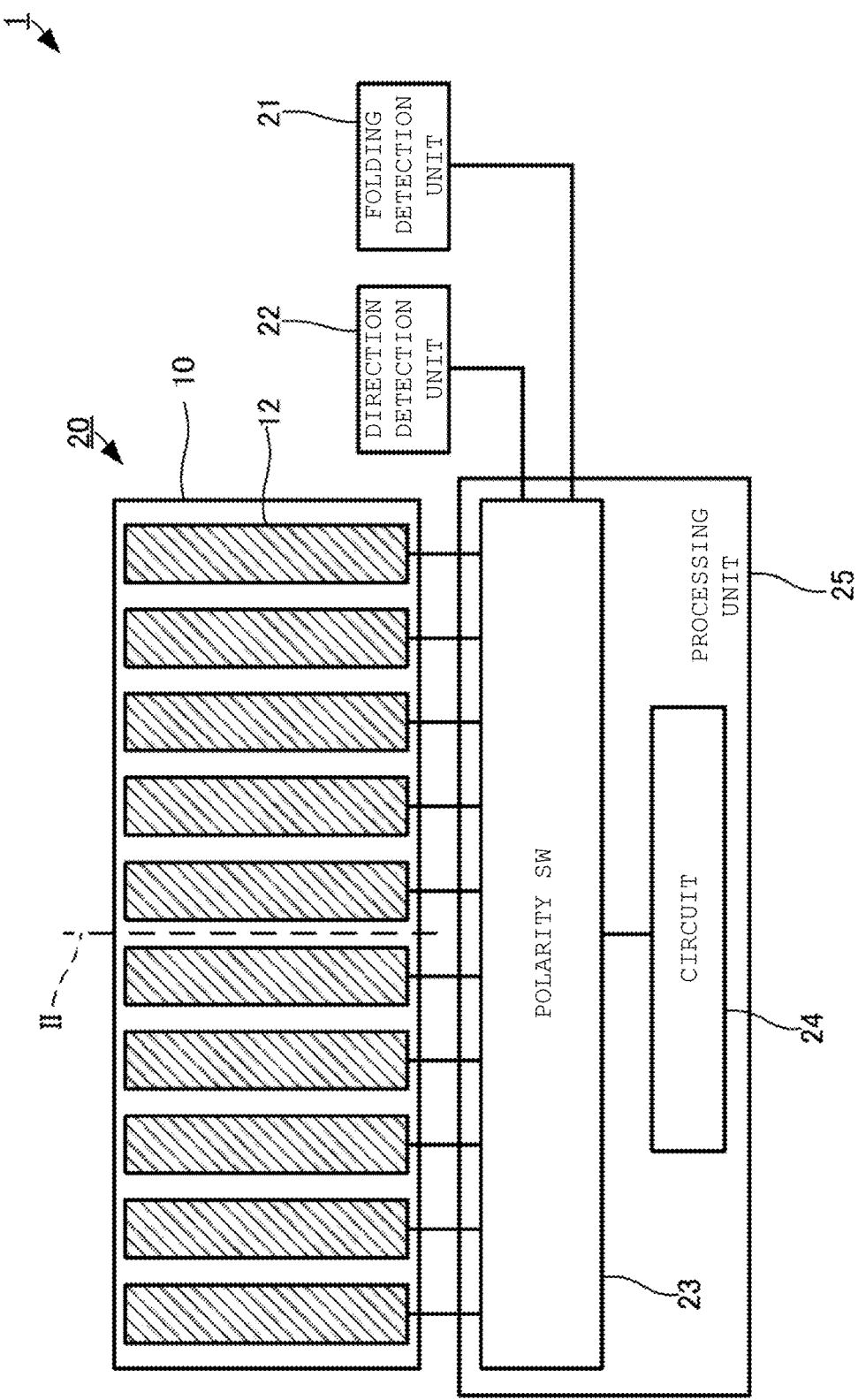
FIG. 2 is a conceptual view for describing the pressure sensor for use in a folding structure according to the first embodiment.

FIG. 2 is a conceptual view for describing the pressure sensor for use in a folding structure according to the first embodiment. As shown in FIG. 2, the pressure sensor 1 includes a sensor element 20, a folding detection unit 21, a direction detection unit 22, and a processing unit 25. The processing unit 25 includes a polarity change switch 23 and a circuit 24. It is noted that in an exemplary aspect, each of the folding detection unit 21, the direction detection unit 22, and the processing unit 25 can be any combination of hardware and/or software configured to perform the algorithms described herein. For example, each such unit can be a microprocessor or similar processing unit that is configured to execute instructions stored on memory for performing the exemplary algorithms described herein.

Figure 3A:
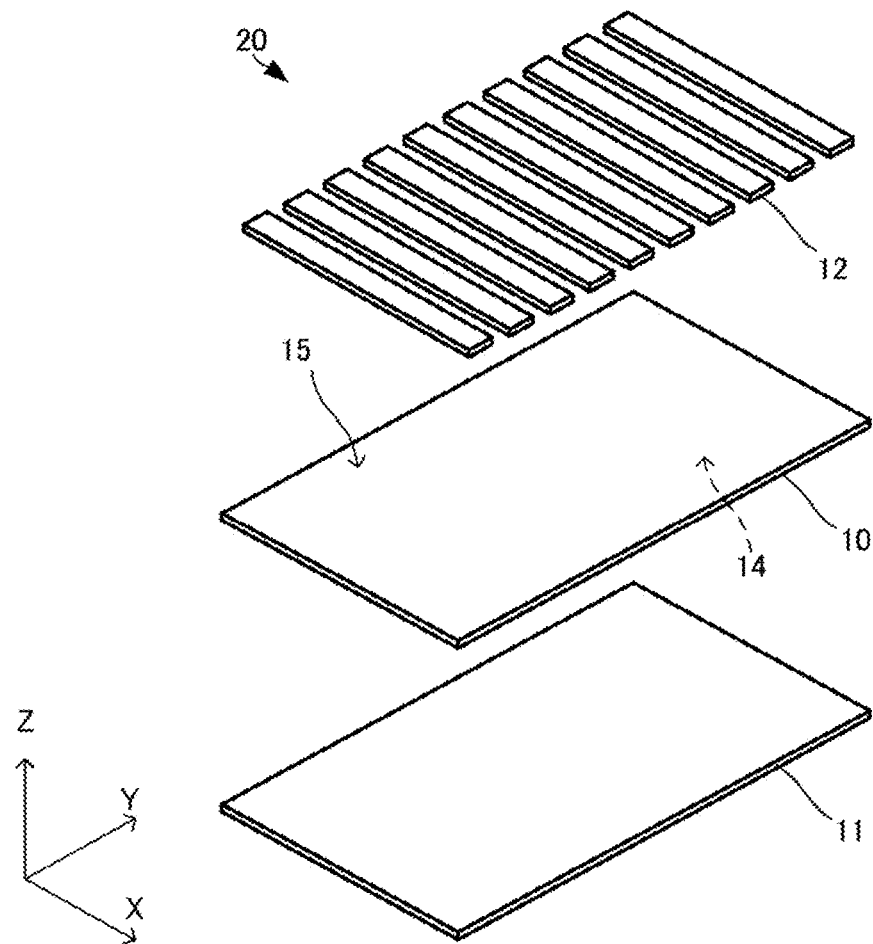
FIG. 3(A) is an exploded perspective view of a sensor element for use in a folding structure according to the first embodiment.
Figure 3B:
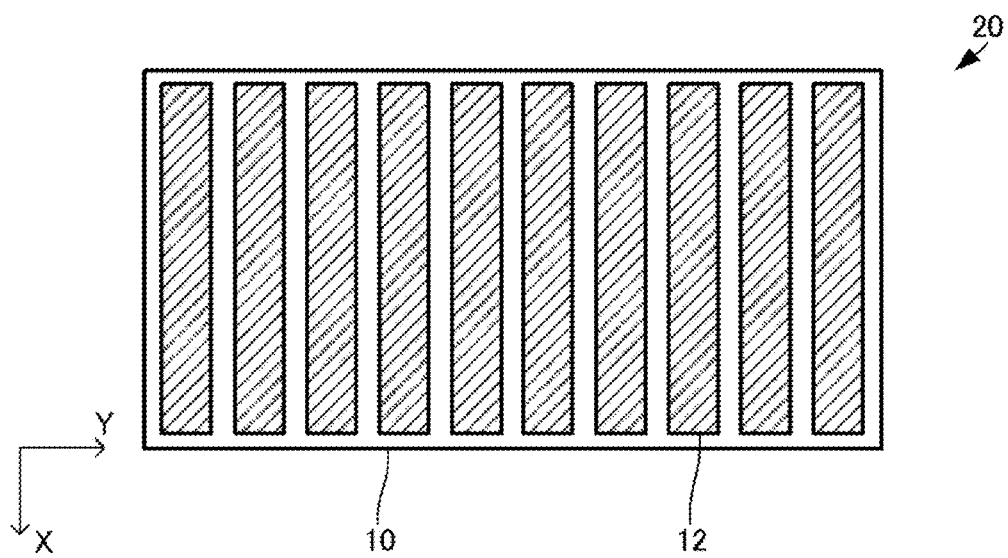
FIG. 3(B) is a plan view of the sensor element.

FIG. 3(A) is an exploded perspective view of the sensor element according to the first embodiment, and FIG. 3(B) is a plan view on an X-Y plane of the sensor element. As shown in FIGS. 3(A) and 3(B), the sensor element 20 includes a piezoelectric film 10, a first electrode 11, and a plurality of second electrodes 12. It is noted that, in FIGS. 3(A) and 3(B), illustrations of parts other than the piezoelectric film 10, the first electrode 11, and the second electrode 12 are omitted for clarity purposes.

The piezoelectric film 10 has a first main surface 14 and a second main surface 15. Moreover, the first electrode 11 has a flat film shape, and is formed in a rectangular shape like the piezoelectric film 10 in a plan view. The first electrode 11 is provided on the first main surface 14 of the piezoelectric film 10. Each of the plurality of second electrodes 12 has a flat film shape, and is provided on the second main surface 15 of the piezoelectric film 10. The second electrodes 12 are arranged side by side along the Y direction orthogonal to the X direction, which is a folding line of the piezoelectric film 10. The number and shape of the second electrodes 12 can be appropriately changed according to the specifications and is not limited to the number of ten as shown in FIG. 3(B), for example.

When the pressure sensor 1 is viewed in plan as shown in FIG. 3(B), at least one of the first electrode 11 and the second electrode 12 preferably completely overlaps the piezoelectric film 10 in a top view, or is preferably positioned inner than the piezoelectric film 10 in a surface direction. In this manner, short circuit in an end portion of the first electrode 11 and the second electrode 12 can be restricted.

Figure 4:
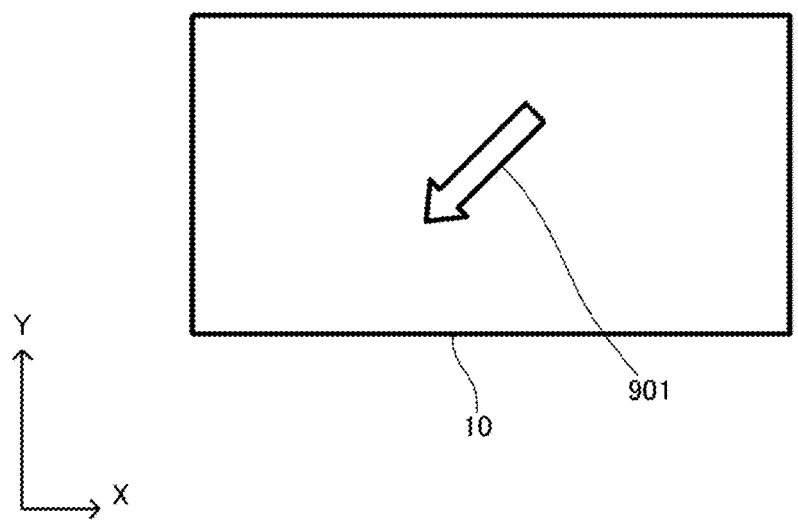
FIG. 4 is a diagram for describing a piezoelectric film according to the first embodiment.

FIG. 4 is a plan view of the piezoelectric film 10. As shown in FIG. 4, the piezoelectric film 10 may be a film formed of a chiral polymer. As the chiral polymer, polylactic acid (PLA), particularly poly-L-lactic acid (PLLA), is used in the first embodiment. In the PLLA including a chiral polymer, a main chain has a helical structure. PLLA has piezoelectricity when uniaxially stretched and molecules are oriented. Then, the uniaxially stretched PLLA generates a voltage when a flat plate surface of the piezoelectric film 10 is pressed. At this time, an amount of the generated voltage depends on a displacement amount by which the flat plate surface is displaced in a direction orthogonal to the flat plate surface by a pressing amount.

In the first embodiment, the uniaxial stretching direction of the piezoelectric film 10 (PLLA) is a direction forming an angle of 45 degrees with respect to the Y direction and the Z direction as shown by an arrow 901 in FIG. 4. This angle of 45 degrees includes, for example, an angle of about 45 degrees±10 degrees. In this manner, a voltage is generated as the piezoelectric film 10 is pressed.

In PLLA, since piezoelectricity is generated by orientation treatment of molecules by stretching or the like, there is no need to perform polling processing like other polymers, such as PVDF, and piezoelectric ceramics. That is, piezoelectricity of PLLA not belonging to ferroelectrics is not expressed by polarization of ions like ferroelectrics, such as PVDF or PZT, but is derived from a helical structure which is a characteristic structure of a molecule. Therefore, pyroelectricity that is generated in other ferroelectric piezoelectric materials is not generated in the PLLA. Since there is no pyroelectricity, the pressure sensor 1 can be formed thin because there is no influence of a temperature or frictional heat of the user's finger. Further, a change in a piezoelectric constant is observed over time in PVDF or the like, and in some cases a piezoelectric constant may decrease significantly. However, a piezoelectric constant of the PLLA is extremely stable over time. Therefore, a displacement, caused by pressing, can be detected with high sensitivity without being affected by a surrounding environment.

As the first electrode 11 and the second electrode 12 formed on both main surfaces of the piezoelectric film 10, electrodes formed from metal, such as aluminum and copper, can be used. Further, if the electrode is required to be transparent, a highly transparent material, such as ITO or PEDOT, can be used for the first electrode 11 and the second electrode 12. By providing the first electrode 11 and the second electrode 12 described above, charges generated by the piezoelectric film 10 can be acquired as voltage, and a pressing amount detection signal of a voltage value corresponding to a pressing amount can be output to the outside.

The folding detection unit 21 detects a state in which the electronic device 100 is folded. That is, the folding detection unit 21 is configured to detect a state in which the piezoelectric film 10 included in the sensor element 20 is folded.

In a case where the folding detection unit 21 detects the folded state of the sensor element 20, that is, the piezoelectric film 10, when the sensor element 20 (i.e., piezoelectric film 10) receives a pressing operation, the processing unit 25 changes processing of at least one of signals generated at the second electrodes. The direction detection unit 22 detects from which direction the sensor element 20 receives a pressing operation. For example, when a user presses the sensor element 20 from a positive direction side of the Z axis shown in FIG. 3(A), the piezoelectric film 10 generates a charge of polarity corresponding to the direction. The direction detection unit 22 is configured to detect the direction in which the pressing operation is received according to the polarity of the generated charge. The folded state of the piezoelectric film 10 and the change in processing performed by the processing unit 25 will be described in detail below.

Figure 5A:
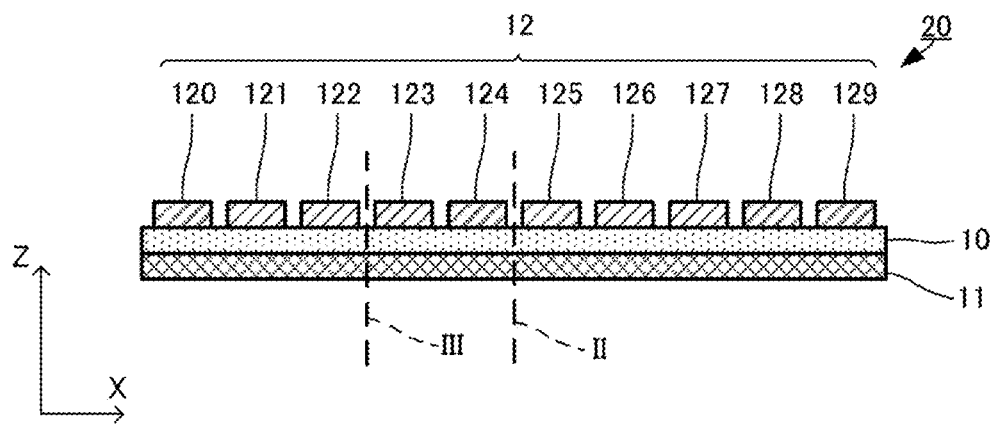
FIGS. 5(A) to 5(C) are cross-sectional schematic diagrams for describing a folded state of the sensor element according to the first embodiment.
Figure 5B:
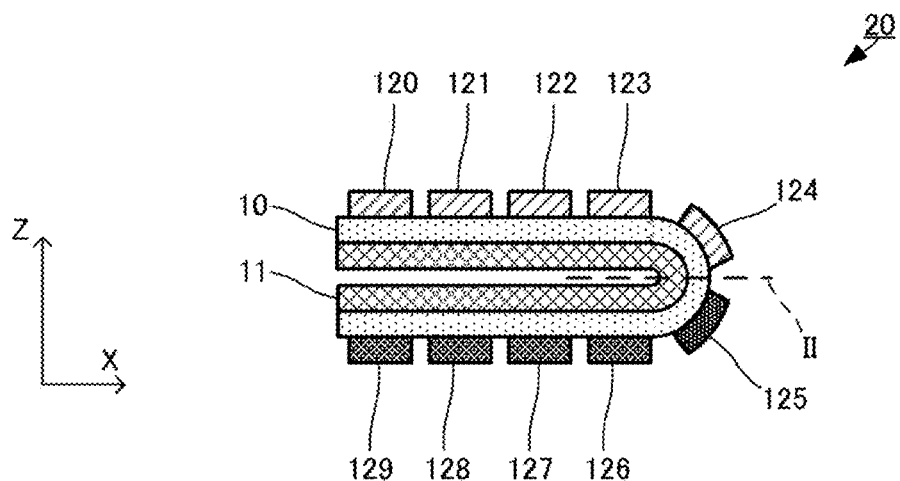
Figure 5C:
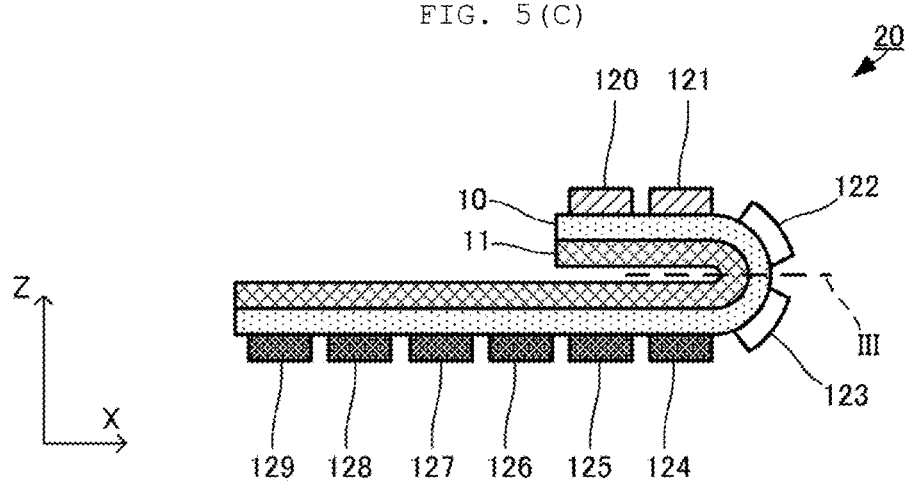

FIGS. 5(A) to 5(C) are cross-sectional views for describing the folded state of the sensor element 20 according to the first embodiment. FIG. 5(A) is a cross-sectional view of the sensor element 20 in a state in which the electronic device 100 is not folded. FIG. 5(B) is a cross-sectional view of the sensor element 20 in a state in which the electronic device 100 is folded in half along a line II of FIG. 5(A). FIG. 5(C) is a cross-sectional view of the sensor element 20 in a state in which part of the electronic device 100 is folded along a line III in FIG. 5(A). As shown in FIGS. 5(A) to 5(C), the plurality of second electrode 12 includes second electrodes 120 to 129.

As shown in FIG. 5(A), in a state in which the electronic device 100 is not folded, all of the second electrode 120 to the second electrode 129 are aligned in a positive direction in the Z axis with respect to the piezoelectric film 10. In this state, even in a case where the sensor element 20 is pressed from either positive or negative direction of the Z axis, all of the second electrode 120 to the second electrode 129 detect charges of the same polarity.

According to the exemplary aspect, the folding detection unit 21 receives a signal indicating that the second electrode 120 to the second electrode 129 detect charges of the same polarity to detect a state in which the electronic device 100 is not folded. In a case where the folding detection unit 21 does not detect the folded state of the sensor element 20, that is, the piezoelectric film 10, the processing unit 25 outputs processing of signals generated on the second electrodes 12 (e.g., the second electrode 120 to the second electrode 129) without changing the processing even if the sensor element 20 (i.e., piezoelectric film 10) receives a pressing operation.

As shown in FIG. 5(B), in a state where the electronic device 100 is folded in half along the line II, the second electrode 120 to the second electrode 124 are positioned in the positive direction in the Z axis from the line II, and the second electrode 125 to the second electrode 129 are positioned in the negative direction in the Z axis from the line II. The second electrode 120 to the second electrode 124 are arranged in the positive direction in the Z axis with respect to the piezoelectric film 10. The second electrode 125 to the second electrode 129 are arranged in the negative direction in the Z axis. In this state, in a case where the sensor element 20 is pressed from either positive or negative direction of the Z axis, the second electrode 120 to the second electrode 124 and the second electrode 125 to the second electrode 129 detect charges of the opposite polarities.

The folding detection unit 21 receives a signal indicating that the second electrode 120 to the second electrode 129 detect charges of different polarities to detect a state in which the electronic device 100 is folded between the second electrode 124 and the second electrode 125. When the folding detection unit 21 detects the folded state of the sensor element 20, that is, the piezoelectric film 10, when the sensor element 20 (i.e., piezoelectric film 10) receives a pressing operation, the processing unit 25 issues an instruction to reverse charges generated on the second electrode 125 to the second electrode 129 to the opposite polarity. The polarity change switch 23 reverses charges generated on the second electrode 125 to the second electrode 129 in response to the instruction from the processing unit 25. The charges generated from the second electrode 120 to the second electrode 124 are output to the circuit 24 with polarity not reversed, and the charges generated from the second electrode 125 to the second electrode 129 are output to the circuit 24 with polarity reversed to the opposite. In this manner, for example, the charge generated from the second electrode 121 can be prevented from being canceled by the charge generated from the second electrode 128 at a position overlapping in the Z-axis direction.

As shown in FIG. 5(C), in a state where part of the electronic device 100 is folded along the line III, the second electrode 120 to the second electrode 122 are positioned in the positive direction in the Z axis from the line III, and the second electrode 123 to the second electrode 129 are positioned in the negative direction in the Z axis from the line III. The second electrode 120 to the second electrode 122 are arranged in the positive direction in the Z axis with respect to the piezoelectric film 10. The second electrode 123 to the second electrode 129 are arranged in the negative direction in the Z axis. In this state, when the sensor element 20 is pressed from either positive or negative direction of the Z axis, the second electrode 120 to the second electrode 122 and the second electrode 123 to the second electrode 129 detect charges of the opposite polarities.

The folding detection unit 21 receives a signal indicating that the second electrode 120 to the second electrode 129 detect charges of different polarities to detect a state in which the electronic device 100 is folded between the second electrode 122 and the second electrode 123. When the folding detection unit 21 detects a folded state of the sensor element 20, that is, the piezoelectric film 10, when the sensor element 20 (i.e., piezoelectric film 10) receives a pressing operation, the processing unit 25 issues an instruction to reverse charges generated on the second electrode 120 and the second electrode 121 to the opposite polarity. The polarity change switch 23 reverses charges generated on the second electrode 120 and the second electrode 121 in response to the instruction from the processing unit 25. The charges generated from the second electrode 124 to the second electrode 129 are output to the circuit 24 with polarity not reversed, and the charges generated from the second electrode 120 and the second electrode 121 are output to the circuit 24 with polarity reversed to the opposite. In this manner, for example, the charge generated from the second electrode 121 can be prevented from being canceled by the charge generated from the second electrode 124 at a position overlapping in the Z-axis direction.

Further, at this time, the processing unit 25 can also issue an instruction to set the charges generated from the second electrode 122 and the second electrode 123 existing near the line III, which is a folding line, to zero. As such, the charges generated from the second electrode 122 and the second electrode 123 are output from the circuit 24 as a zero value. In the vicinity of the second electrode 122 and the second electrode 123, since the piezoelectric film 10 is not parallel to the X-Y plane but distorted, it is possible that an accurate charge cannot be obtained from the electrode existing near a folding line. By setting the charge generated from the electrode existing near the folding line to a zero value, generated charges that are necessary can be detected more accurately.

Figure 6:
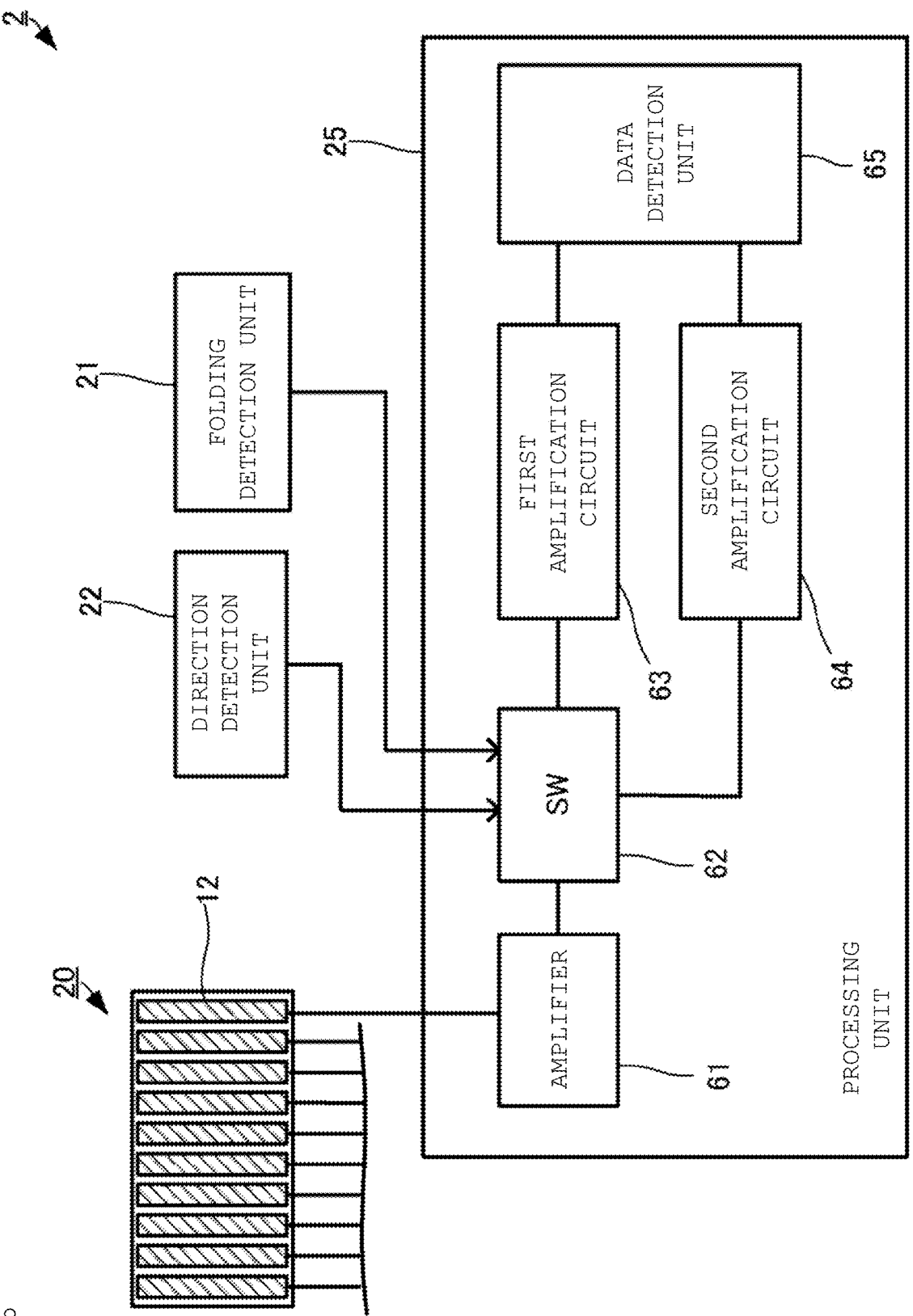
FIG. 6 is a diagram for describing a pressure sensor for use in a folding structure according to a second embodiment.

FIG. 6 is a diagram for describing a pressure sensor for use in a folding structure according to a second embodiment. The pressure sensor 2 according to the second embodiment has a similar configuration to that of the first embodiment, except that the circuit of the processing unit 25 performs signal processing in place of the polarity change switch 23. Therefore, in the second embodiment, only differences from the first embodiment will be described, and description for the remaining parts will be omitted.

As shown in FIG. 6, the processing unit 25 includes a charge amplifier 61, a switch 62, a first amplification circuit 63, a second amplification circuit 64, and a data detection unit 65. The charge amplifier 61 is configured to adjust a voltage obtained from each of the second electrodes 12. The switch 62 receives an instruction from the folding detection unit 21 and the direction detection unit 22. The folding detection unit 21 is configured to detect whether or not the sensor element 20 has been folded. The switch 62 is configured to switch a direction in which a signal adjusted by the charge amplifier 61 is output to the first amplification circuit 63 or the second amplification circuit 64. Switching of the switch 62 is performed based on a detection signal of the folding detection unit 21.

For example, in a case where the folding detection unit 21 detects a folded state from the sensor element 20, the switch 62 switches a signal to be in a direction to be output to the first amplification circuit 63. In a case where the folding detection unit 21 detects an unfolded state from the sensor element 20, the switch 62 switches a signal to be in a direction to be output to the second amplification circuit 64.

In the first amplification circuit 63 or the second amplification circuit 64, different gain adjustments are performed in the exemplary aspect. The gain adjustment is performed, for example, in such a manner that a signal output from the second electrode 12 that is pressed and operated from a predetermined one direction detected by the direction detection unit 22 is increased in the first amplification circuit 63. Further, the gain adjustment is performed in such a manner that the signal output from the second electrode 12 pressed and operated from the opposite direction of the predetermined one direction detected by the direction detection unit 22 is reduced in the second amplification circuit 64.

The data detection unit 65 (e.g., a microprocessor or similar processing unit, for example) is configured to detect a signal output from the first amplification circuit 63 or the second amplification circuit 64. In this manner, different processing is performed between a state in which the sensor element 20 is folded and a state in which the sensor element 20 is not folded. Therefore, even when the sensor element 20 is in a folded state, different processing is performed on an output signal, so that the pressing operation can be detected with high sensitivity.

Figure 7:
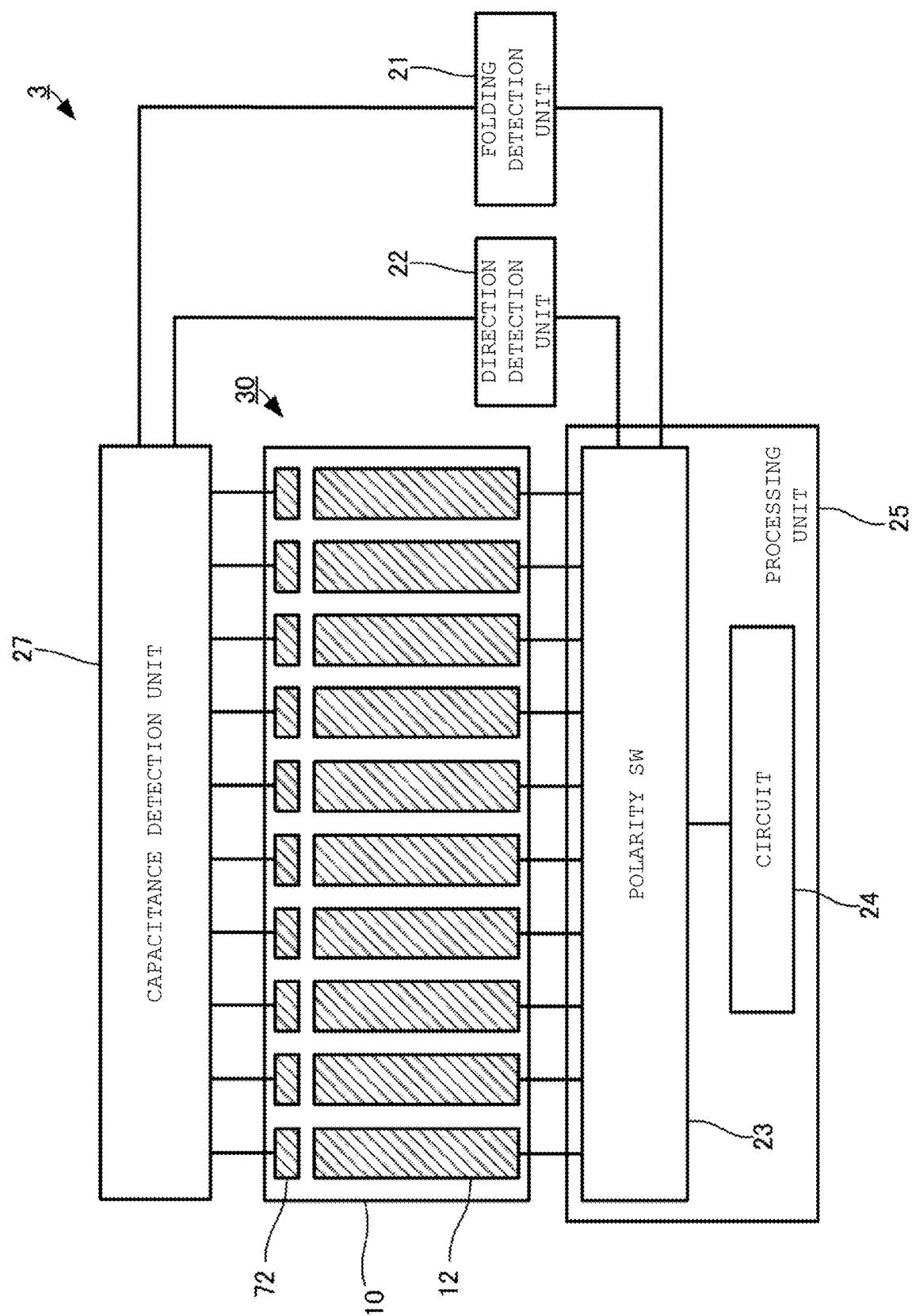
FIG. 7 is a diagram for describing a pressure sensor for use in a folding structure according to a third embodiment.

FIG. 7 is a diagram for describing a pressure sensor for use in a folding structure according to a third embodiment. A pressure sensor 3 according to the third embodiment has a similar configuration to that of the first embodiment, except that the pressure sensor 3 further includes a capacitance detection unit 27 and a second electrode 72 for the capacitance detection unit 27. Therefore, in the third embodiment, only differences from the first embodiment will be described, and description of the remaining parts will be omitted.

As shown in FIG. 7, the pressure sensor 3 includes a sensor element 30 and the capacitance detection unit 27. The sensor element 30 includes the second electrode 12 and the second electrode 72. As similar to the second electrode 12, the second electrodes 72 are arranged side by side along the Y direction orthogonal to the X direction which is a folding line of the piezoelectric film 10. The number and shape of the second electrodes 12 can be appropriately changed according to the specifications and is not limited to the number shown in FIG. 7. It is noted that, in the pressure sensor 3, the second electrode 12 and the second electrode 72 are formed as a pair. However, the present invention is not limited to the above, and, for example, a larger number of the second electrodes 72 may be formed as compared to the second electrodes 12 in an alternative aspect.

For example, the sensor element 30 in a folded state as shown in FIG. 5(B) will be described. The capacitance detection unit 27 detects the capacitance between the second electrodes 72 facing each other. For example, the capacitance is the capacitance between the second electrode 72 paired up with the second electrode 121 and the second electrode 72 paired up with the second electrode 128. At this time, the capacitance between the second electrodes 72 paired up with the second electrode 124 and the second electrode 125 adjacent to the folding line II among the second electrodes 72 is different from that between the other second electrodes 72. According to this configuration, the position at which the sensor element 30 is folded can be accurately detected. Further, by obtaining a change in the capacitance detected by the capacitance detection unit 27 as needed, it is possible to detect opened and closed states of the pressure sensor 3.

Figure 8A:
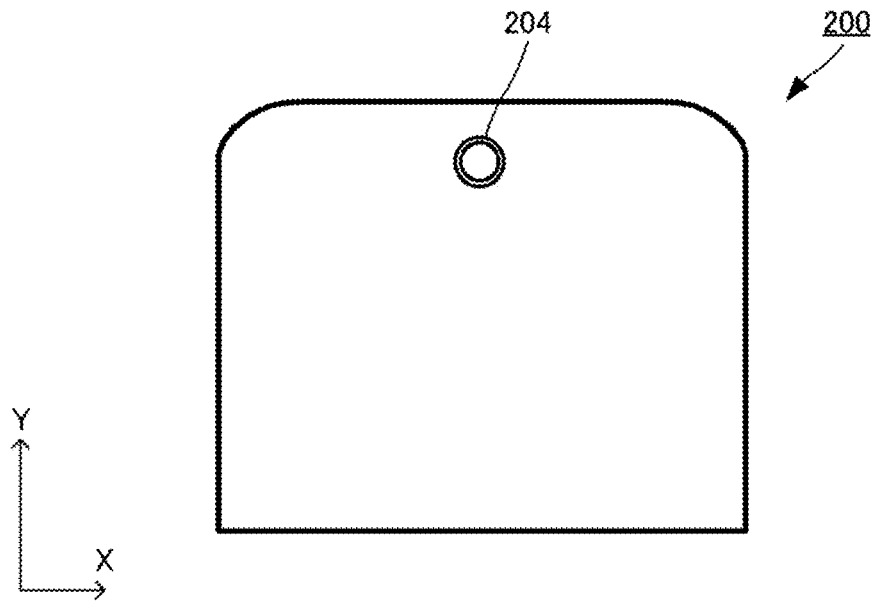
FIGS. 8(A) and 8(B) are diagrams for describing the electronic device according to a fourth embodiment.
Figure 8B:
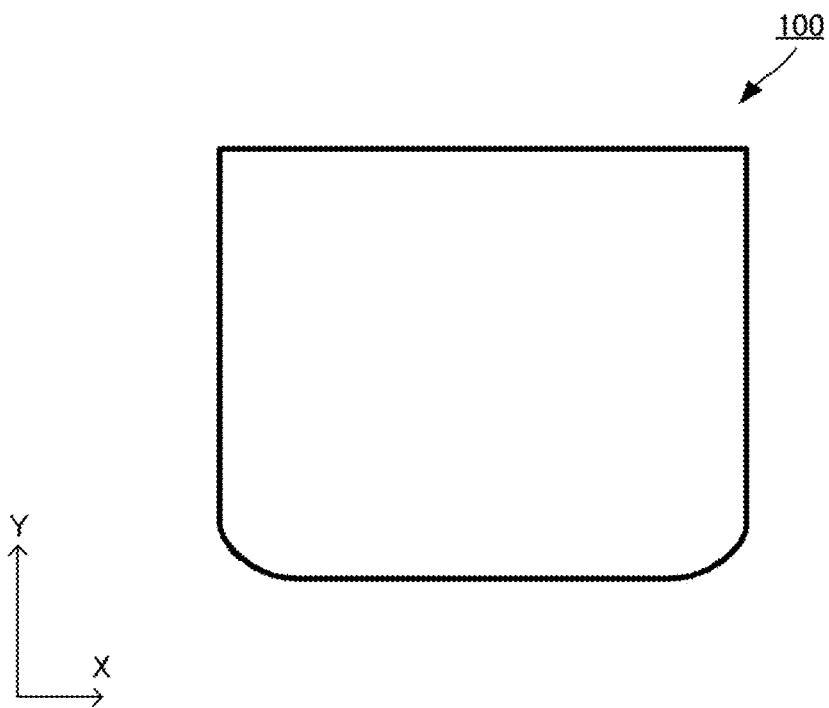

FIGS. 8(A) and 8(B) are diagrams for describing the electronic device according to a fourth embodiment. An electronic device 200 according to the fourth embodiment has a configuration to that of the first embodiment, except that the electronic device 200 further includes a camera 204. Therefore, in the fourth embodiment, only differences from the first embodiment will be described, and description of the remaining parts will be omitted. In the fourth embodiment, a state in which the electronic device 200 is folded will be described. It is noted that the camera 204 as an example of an "image acquisition unit" in the present disclosure.

As shown in FIGS. 8(A) and 8(B), the electronic device 200 includes the camera 204. For example, in a case where the user operates the electronic device 200 from a direction shown in FIG. 8(A), the camera 204 can acquire an image of the user. Conversely, in a case where the user operates the electronic device 200 from a direction shown in FIG. 8(B), the camera 204 cannot acquire an image of the user. By analyzing the image in the camera 204, which surface of the electronic device 200 is operated in a state where the electronic device 200 is folded can be determined.

Figure 9:
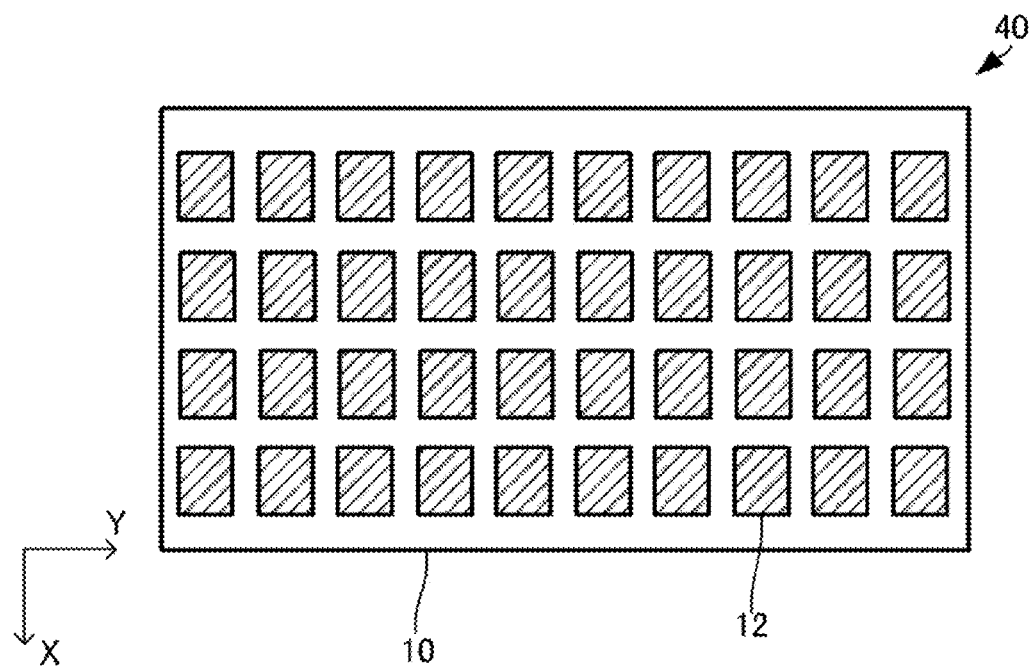
FIG. 9 is a diagram for describing generated potential according to a modification of the exemplary embodiment.
Figure 10A:
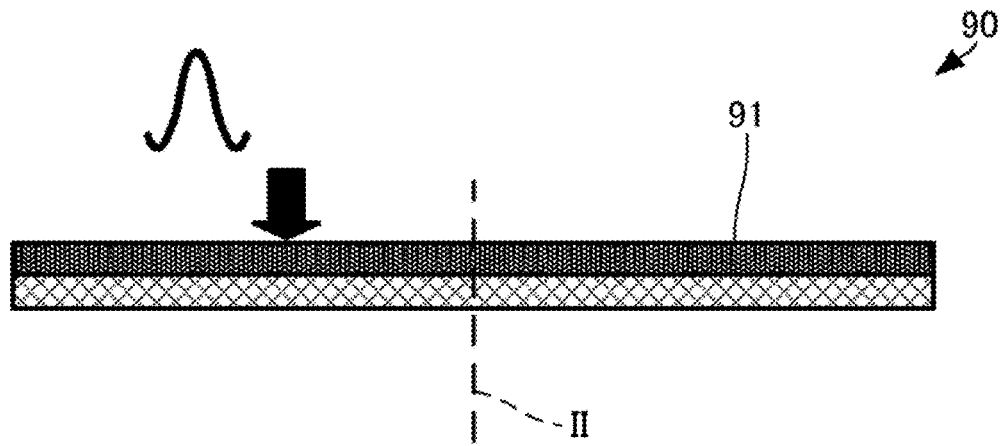
FIGS. 10(A) and 10(B) are diagrams for describing a pressure sensor for use in a conventional folding structure.
Figure 10B:
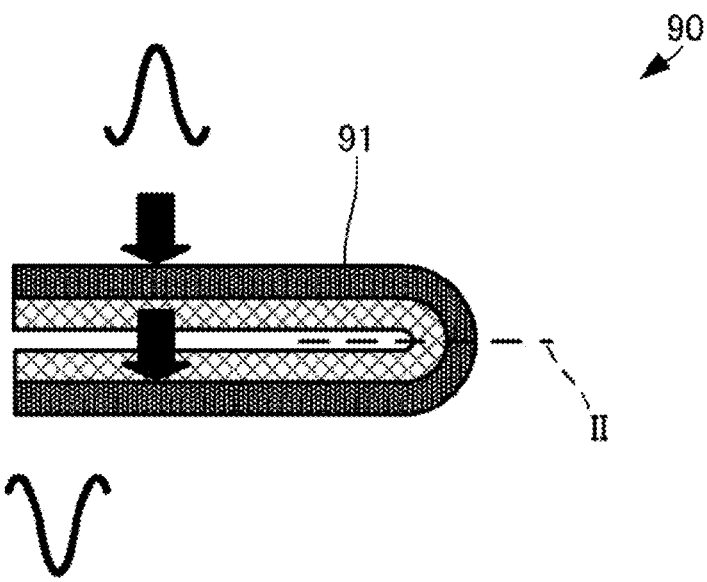

FIG. 9 is a diagram for describing a sensor element according to a modification. A sensor element 40 according to the modification further differs from the sensor element 20 in the arrangement and the shape of the second electrode 12.

As shown in FIG. 9, in the sensor element 40, the plurality of second electrodes 12 are provided along the X-axis direction and the Y-axis direction. In this manner, a folded state of the sensor element 40 can be detected not only when the folding line is along the X-axis direction, but also when the folding line is along the Y-axis direction.

Finally, it is noted that the description of the above exemplary embodiments is to be considered in all respects as illustrative and not restrictive. The scope of the present invention is indicated not by the above-described embodiments but by the claims. Furthermore, the scope of the present invention includes the scope equivalent to that of the claims.

DESCRIPTION OF REFERENCE SYMBOLS 1, 2, 3: Pressure sensor for use in folding structure
11: First electrode
12, 72, 120 to 129: Second electrode
10: Piezoelectric film
14: First main surface
15: Second main surface
21: Folding detection unit
25: Processing unit
100, 200: Electronic device

The invention claimed is:

1. A pressure sensor comprising:
a foldable piezoelectric film having first and second main surfaces that oppose each other;
a first electrode disposed on the first main surface of the piezoelectric film;
a plurality of second electrodes disposed side by side on the second main surface of the piezoelectric film so as to face the first electrode, with the plurality of second electrodes aligned parallel to each other along a direction orthogonal to a folding line of the piezoelectric film;
a folding detection unit configured to detect a folded state in which the piezoelectric film is folded; and
a processing unit configured to switch polarity of respective signals generated on a portion of the plurality of second electrodes when the piezoelectric film receives a pressing operation and the folding detection unit is detecting the folded state of the piezoelectric film,
wherein the portion of the plurality of second electrodes is on one side of the folding line of the piezoelectric film, and
wherein the processing unit switches the polarity of the respective signals to prevent respective signals generated by overlapping second electrodes on the other side of the folding line of the piezoelectric film from being canceled out.

2. The pressure sensor according to claim 1, wherein the processing unit is further configured to determine a second electrode of the plurality of electrodes for which processing of a signal from the determined second electrode is to be changed, based on a signal generated by the piezoelectric film.

3. The pressure sensor according to claim 1, further comprising an image acquisition unit configured to acquire an image, wherein the second electrode for which processing is to be changed is determined based on an image acquired by the image acquisition unit.

4. The pressure sensor according to claim 1, wherein the processing unit is configured to change processing of the at least one signal by adjusting a gain of the signal.

5. The pressure sensor according to claim 1, wherein the folding detection unit includes a capacitance detection unit configured to detect a capacitance generated between the plurality of second electrodes.

6. The pressure sensor according to claim 5, wherein the folding detection unit is further configured to detect the folded state of the piezoelectric film based on detected capacitance.

7. The pressure sensor according to claim 1, wherein the piezoelectric film comprises a chiral polymer.

8. The pressure sensor according to claim 7, wherein the chiral polymer is polylactic acid.

9. The pressure sensor according to claim 1, wherein at least one of the first electrode and the plurality of second electrodes completely overlap the piezoelectric film in a plan view thereof.

10. The pressure sensor according to claim 1, wherein the folding detection unit is configured to detect the folded state of the piezoelectric film in response to receiving the respective signals generated by a portion of the plurality of second electrodes indicating charges of a different polarity from each other.

11. The pressure sensor according to claim 1, wherein the plurality of second electrodes each comprise a rectangular shape in a plan view of the piezoelectric film and are disposed side by side in the direction orthogonal to the folding line of the piezoelectric film with respective long sides of each second electrode being parallel to one another.

12. The pressure sensor according to claim 11, wherein the piezoelectric film comprises a chiral polymer having a uniaxial stretching direction extending at an angle of approximately 45 degrees relative to a lengthwise direction of the plurality of second electrodes.

13. A pressure sensor comprising:
a piezoelectric film having first and second main surfaces that oppose each other;
a first electrode disposed on the first main surface of the piezoelectric film;
a plurality of rectangular-shaped second electrodes disposed on the second main surface of the piezoelectric film in a parallel configuration with respect to each other and extending in a direction orthogonal to a folding line of the piezoelectric film;
a folding detection unit configured to detect a folding state of the piezoelectric film; and
a processing unit configured to switch polarity of respective signals generated on a portion of the plurality of second electrodes based on the detected folding state of the piezoelectric film,
wherein the portion of the plurality of second electrodes is on one side of the folding line of the piezoelectric film, and
wherein the processing unit switches the polarity of the respective signals to prevent respective signals generated by overlapping second electrodes on the other side of the folding line of the piezoelectric film from being canceled out.

14. The pressure sensor according to claim 13, wherein the processing unit is further configured to determine a second electrode of the plurality of electrodes for which processing of a signal from the determined second electrode is to be changed, based on a signal generated by the piezoelectric film.

15. The pressure sensor according to claim 13,
wherein the folding detection unit includes a capacitance detection unit configured to detect a capacitance generated between the plurality of second electrodes, and wherein the folding detection unit is further configured to detect the folded state of the piezoelectric film based on detected capacitance.

16. The pressure sensor according to claim 13, wherein the folding detection unit is configured to detect the piezoelectric film is in a folded state in response to receiving the respective signals generated by a portion of the plurality of second electrodes indicating charges of a different polarity from each other.

17. The pressure sensor according to claim 13, wherein the plurality of second electrodes are disposed side by side in the direction orthogonal to the folding line of the piezoelectric film with respective long sides of each second electrode being parallel to one another.

18. The pressure sensor according to claim 17, wherein the piezoelectric film comprises a chiral polymer having a uniaxial stretching direction extending at an angle of approximately 45 degrees relative to a lengthwise direction of the plurality of second electrodes.

19. An electronic device comprising:
a housing having a cavity;
a flat front panel disposed to seal the cavity on an upper surface of the housing, with the flat front panel being configured as an operation surface for the electronic device;
a display unit disposed in the cavity and under the flat front panel; and
a pressure sensor disposed in the cavity and under the display unit, the pressure sensor including:
a foldable piezoelectric film having first and second main surfaces that oppose each other;
a first electrode disposed on the first main surface of the piezoelectric film;
a plurality of second electrodes disposed side by side on the second main surface of the piezoelectric film so as to face the first electrode, with the plurality of second electrodes aligned parallel to each other along a direction orthogonal to a folding line of the piezoelectric film;
a folding detection unit configured to detect a folded state in which the piezoelectric film is folded; and
a processing unit configured to switch polarity of respective signals generated on a portion of the plurality of second electrodes when the piezoelectric film receives a pressing operation and the folding detection unit is detecting the folded state of the piezoelectric film,
wherein the portion of the plurality of second electrodes is on one side of the folding line of the piezoelectric film, and
wherein the processing unit switches the polarity of the respective signals to prevent respective signals generated by overlapping second electrodes on the other side of the folding line of the piezoelectric film from being canceled out.

* * * * *